(12) United States Patent
Kitada

(10) Patent No.: US 8,494,275 B2
(45) Date of Patent: Jul. 23, 2013

(54) INFORMATION RECOGNITION SYSTEM AND METHOD FOR CONTROLLING THE SAME

(75) Inventor: Naruhide Kitada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 276 days.

(21) Appl. No.: 13/046,279

(22) Filed: Mar. 11, 2011

(65) Prior Publication Data

US 2011/0229039 A1 Sep. 22, 2011

(30) Foreign Application Priority Data

Mar. 17, 2010 (JP) .................................. 2010-060986

(51) Int. Cl.
*G06K 9/00* (2006.01)
*G06K 9/62* (2006.01)
*G06K 9/18* (2006.01)
*G06K 7/10* (2006.01)

(52) U.S. Cl.
USPC ........... 382/187; 382/161; 382/185; 382/186; 382/188; 382/189; 382/321

(58) Field of Classification Search
USPC .................................. 382/161, 185–189, 321
See application file for complete search history.

(56) References Cited

U.S. PATENT DOCUMENTS

| | | | | |
|---|---|---|---|---|
| 5,276,788 A * | 1/1994 | Stapleton | .................... | 345/660 |
| 5,502,803 A * | 3/1996 | Yoshida et al. | ............... | 715/201 |
| 6,965,378 B2 * | 11/2005 | Tanaka | ........................... | 345/179 |
| 8,269,720 B2 * | 9/2012 | Yang et al. | ..................... | 345/158 |
| 2002/0084992 A1 * | 7/2002 | Agnew | ........................... | 345/173 |
| 2005/0248531 A1 * | 11/2005 | Tanaka | ........................... | 345/156 |
| 2006/0182345 A1 * | 8/2006 | Geidl et al. | ................... | 382/188 |
| 2007/0291017 A1 * | 12/2007 | Syeda-Mahmood et al. | . | 345/179 |
| 2008/0259029 A1 * | 10/2008 | Yang et al. | ..................... | 345/158 |
| 2009/0207383 A1 * | 8/2009 | Hirahara et al. | ................ | 353/69 |
| 2010/0033742 A1 | 2/2010 | Hanawa | | |
| 2010/0110005 A1 * | 5/2010 | Chtchetinine et al. | ........ | 345/158 |

FOREIGN PATENT DOCUMENTS

| | | |
|---|---|---|
| CN | 1092541 A | 9/1994 |
| CN | 101646007 A | 2/2010 |
| JP | A-2000-43485 | 2/2000 |

OTHER PUBLICATIONS

Boring et al., "A wall-sized focus plus context display", Proceedings of the Fifth Annual IEEE International Conference on Pervasive Computing and Communications 2007, 2007.*

* cited by examiner

*Primary Examiner* — Anand Bhatnagar
*Assistant Examiner* — Soo Park
(74) *Attorney, Agent, or Firm* — Oliff & Berridge, PLC

(57) ABSTRACT

An information recognition system includes: a display section displaying an image on a display surface at a predetermined display resolution; an image combining section combining a character entry guide with the image, the character entry guide assisting handwritten input to the display surface; an information detecting section detecting handwritten input information at a detection resolution which is higher than the display resolution, the handwritten input information input to the display surface according to the character entry guide; and a character recognizing section performing character recognition based on the information detected at the detection resolution.

12 Claims, 9 Drawing Sheets

| PROJECTION DISTANCE: D | PROJECTION WIDTH W TAKEN BY CAMERA |
|---|---|
| 2.0 [m] | 3000 [px] |
| 3.0 [m] | 4000 [px] |

INFORMATION RECOGNITION SYSTEM AND METHOD FOR CONTROLLING THE SAME

CROSS-REFERENCE

The entire disclosure of Japanese Patent Application No. 2010-060986 filed Mar. 17, 2010 is expressly incorporated by reference herein.

BACKGROUND

1. Technical Field

The present invention relates to an information recognition system and a method for controlling the information recognition system.

2. Related Art

There has been an electronic whiteboard which can convert the contents written on a display surface by hand into electronic information. Moreover, an interactive electronic whiteboard having the function of inputting the electronically converted information to a computer has also been proposed. The interactive electronic whiteboard can import the information written by hand to the computer by almost the same operation as the operation performed on the existing whiteboard by using the application function for the electronic whiteboard. This makes it possible to conduct efficient meetings or classes which provide a high level of visibility.

JP-A-2000-43485 (hereinafter referred to as Patent Document 1) describes an electronic whiteboard system which uses an electronic whiteboard. The electronic whiteboard system described in Patent Document 1 includes a PDP (plasma display panel) for displaying a character and an image, a touch input device provided on a front surface of the PDP, and a computer which performs display control of the PDP based on an input from the touch input device, and the PDP and the touch input device form a display surface and a write surface of the electronic whiteboard. In the computer, electronic whiteboard software, character recognition software which recognizes a handwritten character input via the touch input device and generates character information, and the like are installed.

Incidentally, there are two general methods for recognizing a handwritten character written on the electronic whiteboard. The first is to start the character recognition software on the computer, display a region in which a character is to be written by hand, and write, in the region, a character to be recognized. The second is to perform drawing in a particular region by using a free-form curve and then make the character recognition software on the computer recognize the form of the free-form curve as a character.

The electronic whiteboard enlarges image data supplied from the computer and displays the enlarged image data. As a result, in the above-described first method, as in Patent Document 1, since the region itself in which a character is to be written by hand is enlarged and displayed on the display surface, an operator has to write a large character accordingly. In addition, also in the second method, since the display surface itself is enlarged and projected, it is necessary to write a large character.

However, the larger the display surface of the electronic whiteboard or a projection surface of a projector becomes, the more difficult for the operator situated in a position near the display surface or the projection surface to write a large character. Moreover, writing a large character reduces the number of characters which can be written on the display surface.

Now, there are various methods for detecting a trajectory of handwriting operation, such as a method which uses a whiteboard having a pressure-sensitive surface and a method which uses a position sensing system using infrared radiation. An apparatus for detecting the trajectory of handwriting operation outputs position data according to a detection resolution of each apparatus. In the past, when the computer received the position data, the computer converted the position data into a display resolution of the computer, converted the display resolution into coordinates on the display screen of the computer, and then performed character recognition processing. However, when the detection resolution was lower than the display resolution and the handwritten character was too small, the character sometimes became so illegible that character recognition could not be performed when the data of the trajectory of the handwritten character was converted into the display resolution.

As described above, the existing electronic whiteboard system is less user-friendly because the system requires the operator to write a larger character than is necessary or cannot perform character recognition when a small character is written, and has room for improvement.

SUMMARY

An advantage of some aspects of the invention is to solve the problems described above and to provide an information recognition system and a method for controlling the information recognition system, the system and the method which can perform character recognition when character recognition is performed based on information input to a display surface by hand, the display surface on which image data is enlarged and displayed, even if the user does not write a larger character than is necessary by hand.

An information recognition system according to an aspect of the invention includes: a display section displaying an image on a display surface at a predetermined display resolution; an image combining section combining a character entry guide with the image, the character entry guide assisting handwritten input to the display surface; an information detecting section detecting handwritten input information at a detection resolution which is higher than the display resolution, the handwritten input information input to the display surface according to the character entry guide; and a character recognizing section performing character recognition based on the information detected at the detection resolution.

According to the configuration described above, character recognition is performed on the handwritten input information based on the information detected at the detection resolution which is higher than the display resolution. That is, unlike the existing example in which the detection resolution is converted into the display resolution, character recognition is performed by using the detection resolution as it is. As a result, even if a small character is written, a character is prevented from becoming illegible, and character recognition can be performed normally.

Moreover, in the information recognition system according to the aspect of the invention, the image combining section may combine the information detected by the information detecting section with the image as a handwritten entry status adjusted to the display resolution.

According to the configuration described above, the handwritten entry status is combined with the image. As a result, even if the user writes a small character by hand, the user can easily grasp the entry status and write the character easily.

Furthermore, in the information recognition system according to the aspect of the invention, a storing section storing the information detected at the detection resolution as display data may be provided, and the character recognizing section may perform character recognition based on the display data stored in the storing section.

According to the configuration described above, by holding the information detected at the detection resolution which is higher than the display resolution as display data, that is, by storing the information in the storing section, it is possible to perform character recognition collectively on the information written in the character entry guide. For example, a plurality of character entry guides are arranged and displayed, and, after characters are written in all the character entry guides, character recognition can be collectively performed on the characters.

In addition, in the information recognition system according to the aspect of the invention, the display surface may be a projection surface on which the image is projected by a projector provided with at least the display section, and the information recognition system may further include: a distance detecting section detecting a projection distance to the projection surface; and a size obtaining section obtaining the size of the character entry guide based on the projection distance and a predetermined number of pixels required for character recognition.

In the projector, the greater the projection distance becomes, the larger an enlarged image becomes. That is, the size of one pixel is enlarged. According to the configuration described above, since the size of the character entry guide is obtained based on the projection distance and the number of pixels required for character recognition, it is possible to provide a character entry guide of an appropriate size even if the projection distance is changed. Since the user can recognize an appropriate size required for character recognition, it is possible to display an easy-to-use character entry guide for the user situated in a position near the display surface.

Moreover, in the information recognition system according to the aspect of the invention, the information detecting section may be an image taking section taking an image of the projection surface, and the distance detecting section may detect the projection distance to the projection surface according to a projection width of the projection surface whose image is taken by the image taking section.

According to the configuration described above, since the projection distance can be detected according to the projection width obtained when the image taking section takes an image of the projection surface, there is no need to provide an extra unit for detecting the projection distance as long as the projector already has the image taking section.

Furthermore, in the information recognition system according to the aspect of the invention, the size obtaining section may obtain a designated size obtained by adding an adjustment value according to the projection distance to the size of the character entry guide, and the, image combining section may combine the character entry guide of the designated size with the image.

When a character entry guide formed of the number of pixels required for character recognition is displayed, it is necessary to write a character of a size which leaves almost no space in the guide for normal character recognition. According to the configuration described above, the character entry guide has a designated size obtained by the addition of an adjustment value. This makes it possible for the user to perform handwritten input in a size in which the user can write a character more easily.

In addition, in the information recognition system according to the aspect of the invention, the character recognizing section may perform character recognition without changing the size of character when variations in size of the handwritten input information is within a predetermined allowable range.

It is rather difficult to write characters with the same size by hand on a large display surface. According to the configuration described above, by setting an allowable range, characters within the allowable range can be automatically recognized to have the same size, and characters which are not within the allowable range can be automatically recognized to have different sizes. This eliminates the need to set a font size in each case, and makes it possible to perform handwritten character input operation smoothly.

According to another aspect of the invention, there is provided a method for controlling an information recognition system provided with an information detecting device and an image supplying device, the method including: (a) displaying an image on a display surface at a predetermined display resolution; (b) combining a character entry guide assisting handwritten input to the display surface with the image; (c) detecting handwritten input information input to the display surface according to the character entry guide at a detection resolution which is higher than the display resolution; and (d) performing character recognition based on the information detected at the detection resolution.

According to the configuration described above, unlike the existing example in which the detection resolution is converted into the display resolution, character recognition is performed by using the detection resolution as it is. As a result, even if a small character is written, a character is prevented from becoming illegible, and character recognition can be performed normally. Moreover, it is possible to display an easy-to-use character entry guide for the user situated in a position near the display surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of an information recognition system and a method for controlling the information recognition system, the system and the method according to the invention, will be described with reference to the drawings.

Regarding Information Recognition System

Figure 1:
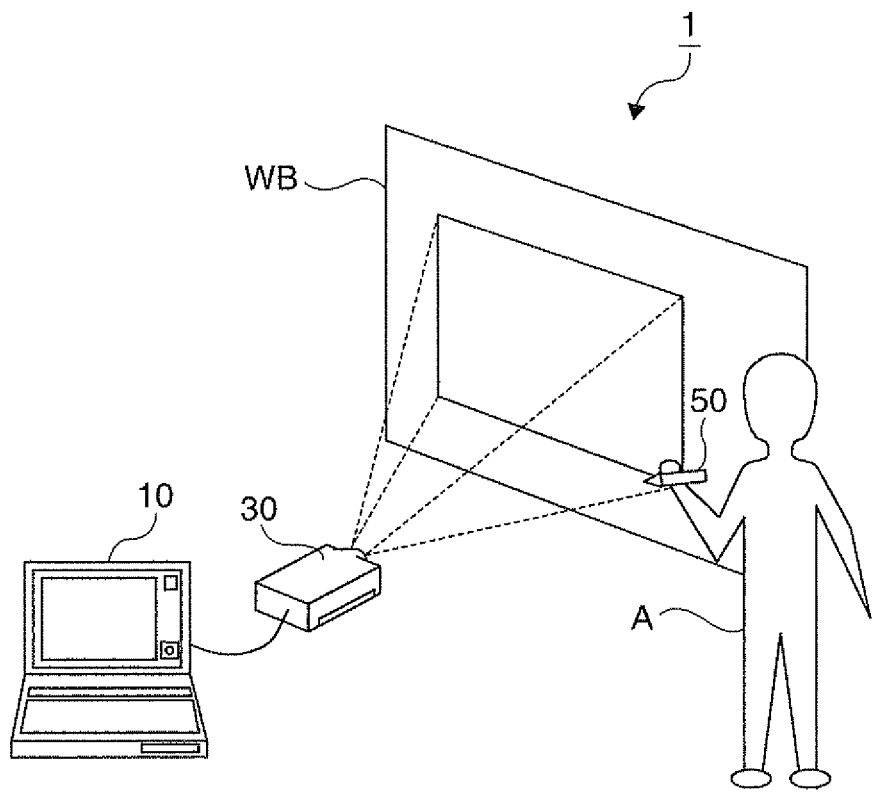
FIG. 1 shows a schematic configuration of an information recognition system according to an embodiment.

The configuration of the information recognition system of this embodiment will be described with reference to FIG. 1.

An information recognition system 1 of this embodiment includes a personal computer 10 (hereinafter referred to as a "PC"), a projector 30, a whiteboard WB, and a pen device 50.

First, an outline of the operation of the information recognition system 1 of this embodiment will be described. FIG. 1 shows a scene in which a user A makes a presentation while entering a character or the like on the whiteboard WB by using the pen device 50. An image of a trajectory of the pen device 50 is taken by a camera built into the projector 30, and taken image data is transferred to the PC 10. The PC 10 converts the trajectory of the pen device 50 into line data based on the taken image data, and performs character recognition based on the line data. The system projects an image with which font data obtained by character recognition is combined onto the whiteboard WB by the projector 30.

The PC 10 includes an unillustrated CPU which serves as a nerve center of arithmetic processing, and the CPU can access to ROM and RAM via a system bus. Moreover, a hard disk drive and a floppy® disk drive or a CD-ROM drive, which serve as an external storage device, are connected to the system bus, and an OS (operating system) or an application stored in the hard disk drive is transferred to the RAM. The CPU executes a software while appropriately accessing to the ROM and the RAM.

In this embodiment, an electronic whiteboard application, a character recognition application, and the like are stored in the hard disk drive. By executing these applications under a software execution environment offered by the OS, the CPU performs character recognition on information written on the whiteboard WB by hand with the pen device 50, and the recognized character is projected onto the whiteboard WB. In this way, an environment of a so-called electronic whiteboard is realized.

Figure 2:
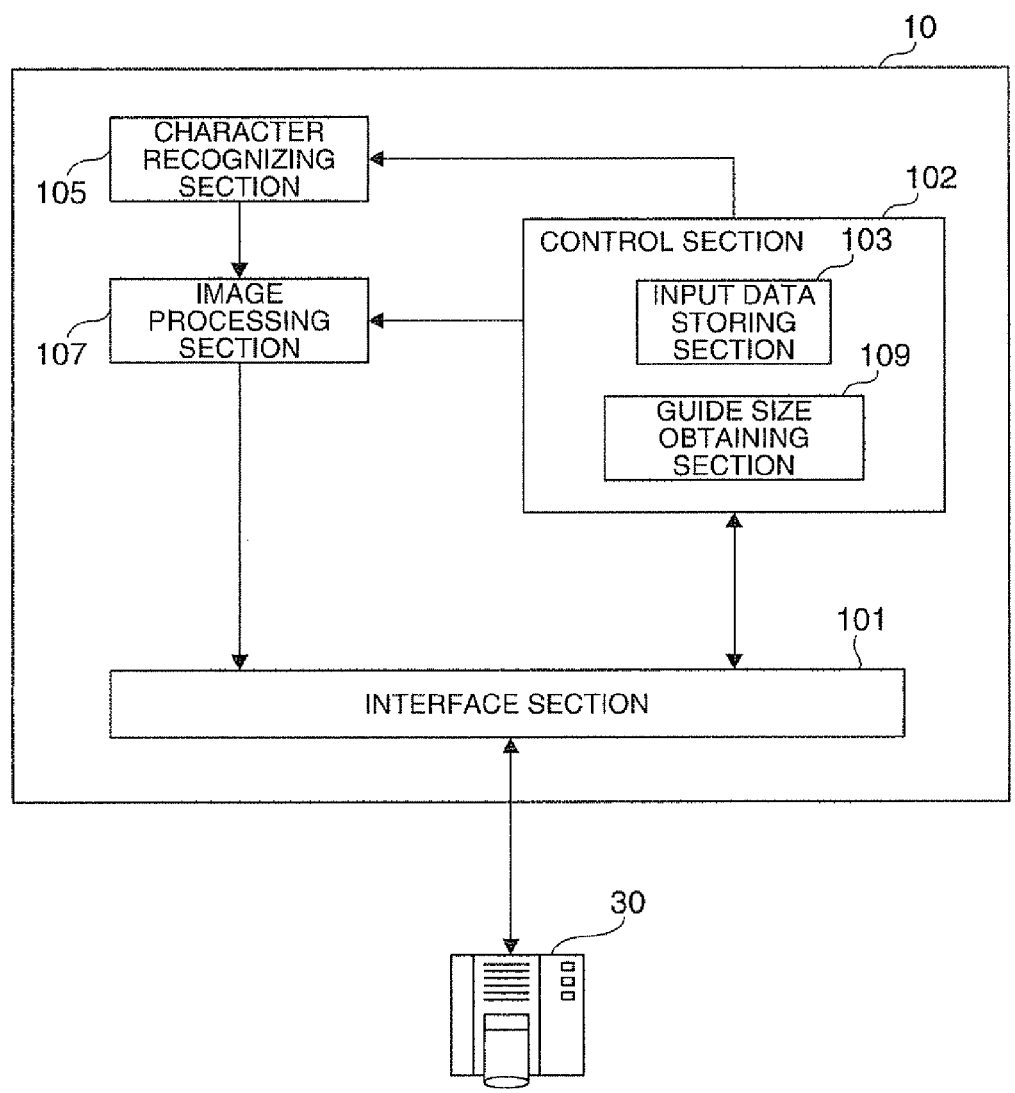
FIG. 2 is a block diagram for explaining the function realized by a computer in the information recognition system of this embodiment.

As a result of the CPU of the PC 10 executing the electronic whiteboard application and the character recognition application, an interface section 101, a control section 102, a character recognizing section 105, and an image processing section 107 are formed in the PC 10 as shown in FIG. 2.

The interface section 101 connects to an interface section, which will be described later, of the projector 30, performs predetermined output interface processing on image data output from the PC 10, and outputs the processed image data to the projector 30. In this embodiment, a USB (universal serial bus) cable is adopted, and the PC 10 and the projector 30 are connected in a state in which transmission and reception of information is possible by using a USB interface. As the PC 10, a personal computer with a common structure can be adopted.

In the control section 102, an input data storing section 103 and a guide size obtaining section 109 are formed in order to perform various types of control for using the whiteboard WB as an electronic whiteboard. When the control section 102 receives taken image data which is data of an image of a trajectory of the pen device 50, the taken image data received from the projector 30 via the interface section 101, the control section 102 converts the taken image data into line data and temporarily stores the line data in the input data storing section 103.

The guide size obtaining section 109 obtains a projection size of a character entry guide for assisting a handwritten character input operation which is performed by the user A. The character entry guide is combined with the image data supplied from the PC 10, and is projected onto the whiteboard WB. The user A performs handwritten input by using the pen device 50 while being assisted by the projected character entry guide. This makes it possible to use a surface of the whiteboard WB efficiently. The details will be described later.

The character recognizing section 105 performs character recognition processing based on the line data stored in the input data storing section 103. The character recognizing section 105 obtains the font data of a character corresponding to the line data by referring to a character recognition dictionary which is previously held in the ROM or the like, and sends the font data to the image processing section 107. Incidentally, the line data is data obtained based on the taken image data taken by a camera 350 with a higher (finer) resolution than a projection resolution of the projector 30. Since character recognition is performed based on the data obtained at a higher (finer) resolution than the projection resolution, it is possible to perform precise character recognition processing.

The image processing section 107 obtains the image data from various types of drives such as a hard disk drive, and performs image processing for making a monitor of the PC 10 display the image data or making the projector 30 project the image data. Moreover, the image processing section 107 converts a character code entered from a keyboard of the PC 10 into font data and combines the font data with the image data. Furthermore, the image processing section 107 adjusts the brightness, color, contrast, sharpness, etc. of the image which is to be displayed on a display of the PC 10. In addition, the image processing section 107 generates a character entry guide according to the size of the character entry guide obtained by the guide size obtaining section 109, and transmits the character entry guide to the projector 30 via the interface section 101.

Regarding Internal Configuration of Projector

The internal configuration of the projector in the information recognition system of this embodiment will be described with reference to FIG. 3.

Figure 3:
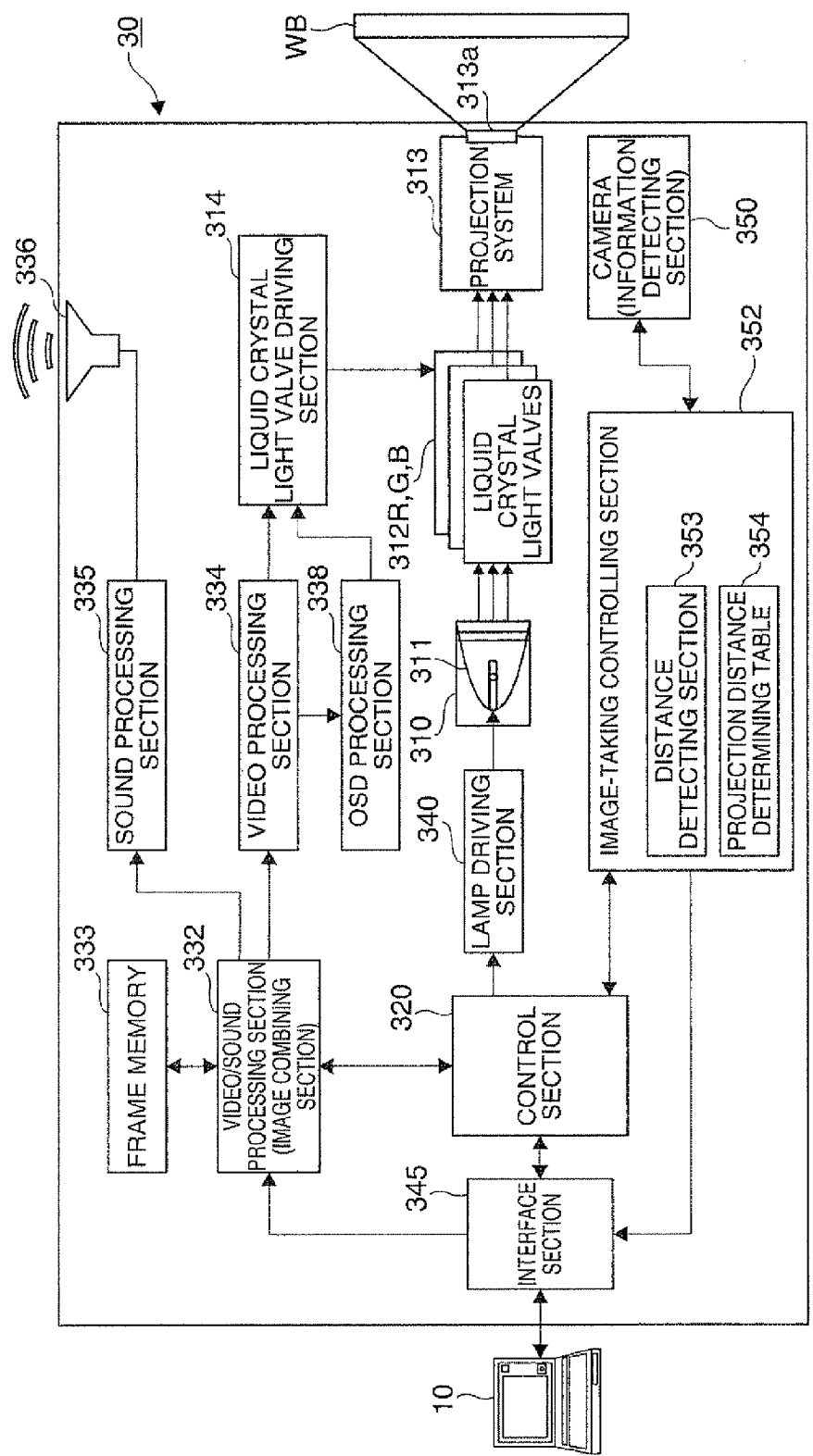
FIG. 3 is a block diagram for explaining the internal configuration of a projector in the information recognition system of this embodiment.

As shown in FIG. 3, the projector 30 includes a lamp 311, liquid crystal light valves 312R, G, and B which are a light modulation unit, a projection system 313, a liquid crystal light valve driving section 314, a control section 320, a video/sound processing section 332 which is an image combining section, a frame memory 333, a video processing section 334, a sound processing section 335, a speaker 336, an OSD (on-screen display) processing section 338, a lamp driving section 340, an interface section 345, the camera 350 which is an information detecting section and an image taking section, and an image-taking controlling section 352 which controls the operation of the camera.

The lamp 311 is housed in a lamp housing 310 and can be separated from the projector 30 alone as a lamp unit. The lamp 311 has a life, but the lamp unit can be replaced with a new one at the end of the life of the lamp 311.

The projection system 313 has a projection lens 313a. The projector 30 projects an optical image according to a video signal supplied via the interface section 345, and enlarges and projects the optical image on the whiteboard WB via the projection lens 313a.

The control section 320 is connected to the video/sound processing section 332, the OSD processing section 338, the lamp driving section 340, the interface section 345, and the image-taking controlling section 352. The control section 320 includes a microprocessor, a nonvolatile storing section, and a main storing section to which the microprocessor can access directly. In addition to a control program product for controlling various types of operation of the projector 30 and OSD information for generating OSD images such as display of the trapezoidal distortion correction amount, the nonvolatile storing section stores various setting values etc. of the projector 30.

The microprocessor performs centralized control of the operation of the projector 30 by executing the control program product etc. stored in the nonvolatile storing section, performs computations on various types of data input from the individual sections connected to the control section 320, and outputs computation results to the individual sections.

The video/sound processing section 332 (the image combining section) decodes the image data received from the interface section 345 and converts the image data into pre-compression coding video data, converts the pre-compression coding video data into an RGB signal, for example, and sequentially outputs the RGB signals to the video processing section 334. Moreover, in this embodiment, the video/sound processing section 332 receives, from the PC 10, an image representing the character entry guide which assists handwritten input to the whiteboard WB or an entry status in which the user performs handwritten input according to the character entry guide, and combines the image with the image data.

Furthermore, the video/sound processing section 332 decodes a sound signal in a similar manner, converts the sound signal into sound data by D/A conversion, and sequentially outputs the sound data to the sound processing section 335. The frame memory 333 is connected to the video/sound processing section 332, and the video/sound processing section 332 makes the frame memory 333 store the video data on a frame-by-frame basis and reads the video data stored in the frame memory 333.

The video processing section 334 performs γ correction processing, trapezoidal correction processing, resolution conversion processing, and the like on the RGB signal received from the video/sound processing section 332, and outputs the processed signal to the liquid crystal light valve driving section 314.

The liquid crystal light valve driving section 314 drives the liquid crystal light valves 312R, G, and B according to the input RGB signal. The liquid crystal light valves 312R, G, and B each have a plurality of pixels arranged in matrix. The transmittance of each pixel is adjusted by the liquid crystal light valve driving section 314, whereby color lights of R (red), G (green), and B (blue), the color lights emitted from the lamp 311 and obtained by separation by a color light separation system, are modulated by the corresponding liquid crystal light valves 312R, G, and B, and optical images are emitted. The optical images emitted from the liquid crystal light valves 312R, G, and B are combined by a light combining system such as a cross-dichroic prism, and the image thus obtained is enlarged and projected onto the whiteboard WB by the projection lens 313a of the projection system 313.

The sound processing section 335 outputs the sound data received from the video/sound processing section 332 to the speaker 336. Incidentally, the sound processing section 335 has a sound volume amplifying section, in which the sound volume is amplified and the sound data is then output to the speaker 336. As a result, the speaker 336 outputs an analog sound signal which is input thereto after amplification.

The OSD processing section 338 receives the OSD information, such as menu images and images displayed when a video input terminal is detected, from the control section 320 and generates OSD images. Moreover, the OSD processing section 338 combines the generated OSD images with the video data received from the video processing section 334 and transmits resultant data to the liquid crystal light valve driving section 314.

The lamp driving section 340 is a lighting unit which turns on or off the lamp 311 according to an instruction from the control section 320. When the lamp 311 is a high-pressure discharge lamp, for example, the lamp driving section 340 is formed of a lighting circuit which applies a starting voltage, a stabilizer which supplies an appropriate lamp current, and the like.

The interface section 345 receives an operation signal input from an unillustrated operation panel or remote controller and outputs the operation signal to the control section 20. Moreover, the interface section 345 establishes wired or wireless connection with the PC 10, performs predetermined input interface processing on the image data output from the PC 10, and outputs the processed data to the video/sound processing section 332. Furthermore, the interface section 345 performs predetermined output interface processing on the taken image data obtained by the image-taking controlling section 352 and transmits the processed data to the PC 10.

Incidentally, as mentioned earlier, the PC 10 and the projector 30 are connected in a state in which transmission and reception of information is possible by using a USB interface. However, the configuration is not limited to such a configuration, and a configuration which uses an interface other than the USB interface may be adopted. Moreover, a configuration in which the PC 10 and the projector 30 are connected in a state in which transmission and reception of information is possible by using, for example, a network or the like may be adopted. Here, examples of the network are the Internet based on a general-purpose protocol such as TCP/IP, an intranet, a LAN (local area network), and a wireless communication line.

The image-taking controlling section 352 controls image-taking operation performed by the camera 350. In this embodiment, the camera 350 takes an image of a trajectory of the pen device 50 on the whiteboard WB, temporarily stores taken image data, and transmits the taken image data to the PC 10 via the interface section 345. Furthermore, the image-taking controlling section 352 includes a distance detecting section 353 and a projection distance determining table 354. The distance detecting section 353 detects a distance to the whiteboard WB based on the taken image data and the projection distance determining table 354. The projection distance determining table 354 is a table defining a correspondence relationship between a projection width of a projection image projected on the whiteboard WB and a projection distance.

Figures 4, 5:
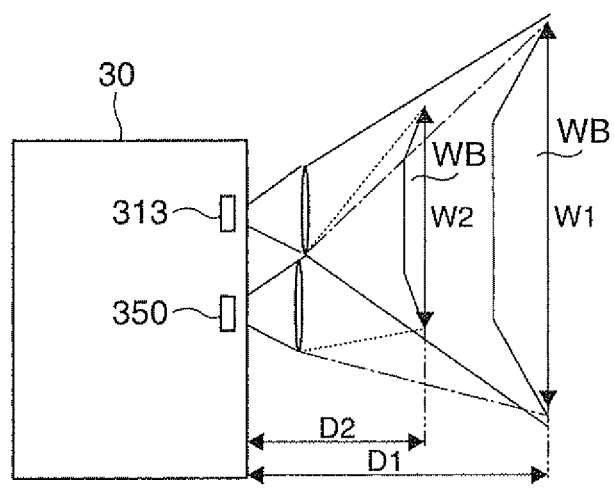
FIG. 4 shows an example of a table giving a relationship between a projection distance and a projection width taken by a camera.
FIG. 5 is a schematic view for explaining a method for detecting the projection distance in this embodiment.
Figure 6:
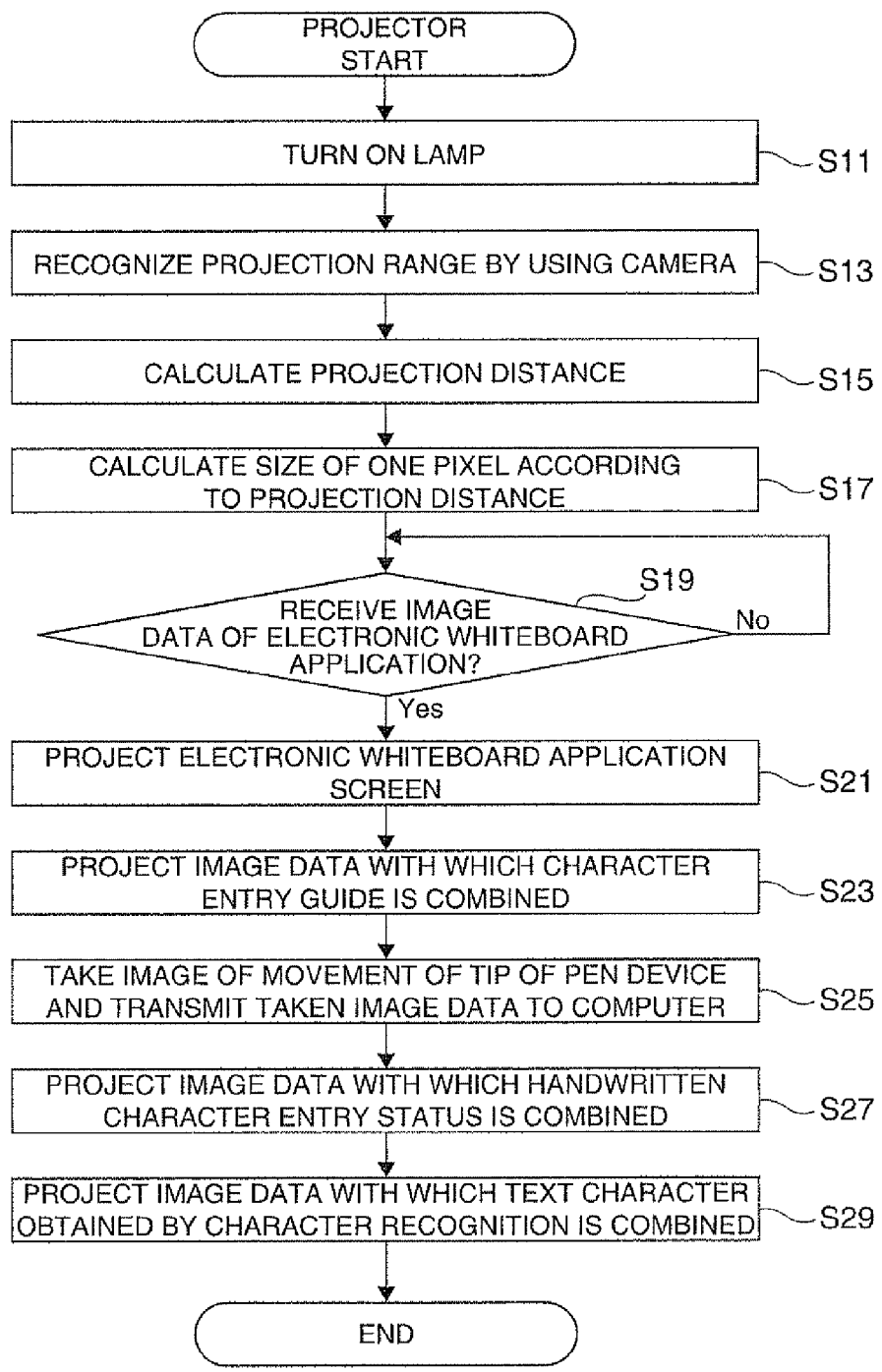
FIG. 6 is a flowchart for explaining the processing performed by the projector in the information recognition system of this embodiment.

FIG. 4 shows a table giving a relationship between a projection distance D and a projection width W which can be taken by the camera 350. FIG. 5 shows a case in which an image of the whiteboard WB is taken from a projection distance D1 and a case in which an image of the whiteboard WB is taken from a projection distance D2. The distance detecting section 353 detects an edge part of an outer frame of the whiteboard WB, the edge part included in the taken image data, and obtains the number of pixels (px) between the detected edges as a projection width. Assume that the projection width is W px. Then, if W1 is 4000 px, the distance detecting section 353 detects that the projection distance D1 is 3.0 m based on the projection distance determining table 354. Moreover, if W2 is 3000 px, the distance detecting section 353 detects that the projection distance D2 is 2.0 m. Incidentally, the camera 350 adopted in this embodiment is assumed to have an image-taking resolution of ten million pixels (=4000 px×2500 px) and have a higher (finer) resolution than the projection resolution (for example, 1920 px×1080 px) of the projector 30.

Incidentally, as shown in FIG. 5, since the projection system 313 and the camera 350 which are built into the projector 30 are usually placed in different positions, the values in the table of FIG. 4 have no proportional relation due to a difference in viewing angle. The values in the table of FIG. 4 may be set so as to have a proportional relation when the projection system 313 and the camera 350 can be set so as to have the same viewing angle. That is, if the projection width W2 is 3000 px when the projection distance D2 is 2.0 m, the projection width W1 when the projection distance D1 is 3.0 m may be set at 4500 px (=3000×1.5) because 3.0 m/2.0 m=1.5.

The method for detecting the projection distance is not limited to the method described above. For example, the projector 30 may include a unit emitting a luminous flux in an infrared region or a light such as a laser and a unit receiving the light reflected from the whiteboard WB, and these units may be collectively provided as a distance detecting section. By doing so, it is possible to detect the distance based on the amount of reflected light or the angle of reflection and detect the projection distance based on a phase difference of light.

Regarding Method for Controlling Information Recognition System

Next, a method for supporting an entry of a handwritten character by using the information recognition system described above will be described with reference to FIGS. 6 to 12. In this embodiment, an image of a trajectory of a character written by hand on the whiteboard WB by the user A by using the pen device 50 is taken by a camera with a higher (finer) resolution than the projection resolution of the projector 30, and character recognition is performed based on high-resolution taken image data. Font data is obtained by performing character recognition on the handwritten character based on the high-resolution taken image data obtained by the camera 350, and the font data thus obtained is combined with image data.

First, when the user A turns ON the projector 30, the lamp driving section 340 turns on the lamp 311 (step S11). Next, the image-taking controlling section 352 controls the camera 350 so that the camera 350 takes an image of the whiteboard WB, and thereby obtains taken image data. The distance detecting section 353 detects an edge part of the whiteboard WE, the edge part included in the taken image data, and recognizes a projection range (step S13). Instead, the user A may mark the projection range on the whiteboard WB by using the pen device 50. In this case, by detecting the mark from the taken image data, it is possible to make the distance detecting section 353 recognize the mark as the projection range.

The distance detecting section 353 obtains, as a projection width, the number of pixels between the edges from the detected projection range, and calculates the projection distance by referring to the projection distance determining table shown in FIG. 4 (step S15). Next, the image-taking controlling section 352 calculates the size of 1 px according to the projection distance calculated in step S15 (step S17). For example, since the projection distance D1 is 3.0 m when the projection width W1 is 4000 px, the size of 1 px is calculated as follows: 3000 mm/4000 px=0.75 mm/px. Moreover, if the projection distance D2 is 2.0 m when the projection width W2 is 3000 px, the size of 1 px is calculated as follows: 2000 mm/3000 px≈0.67 mm/px. The calculated size of 1 px is transmitted to the PC 10.

Figure 7:
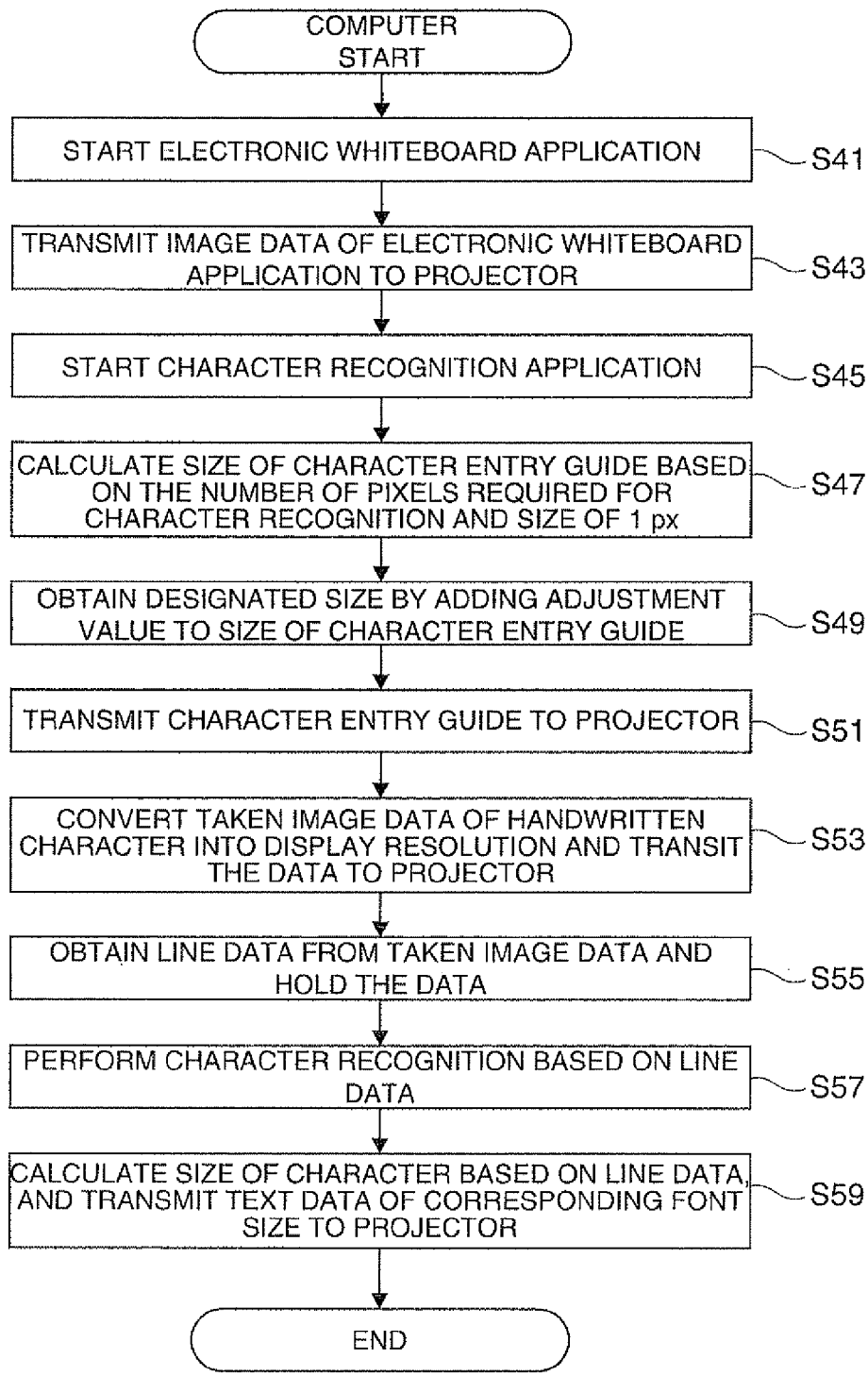
FIG. 7 is a flowchart for explaining the processing performed by a computer main body in the information recognition system of this embodiment.

On the other hand, as shown in FIG. 7, the CPU of the PC 10 executes and starts the electronic whiteboard application stored in the hard disk drive (step S41). The image processing section 107 generates an electronic whiteboard application screen, and the application screen is displayed on the display of the PC 10 via the interface section 101. Moreover, image data of the electronic whiteboard application screen is transmitted to the projector 30 via the interface section 101 (step S43).

Figure 8:
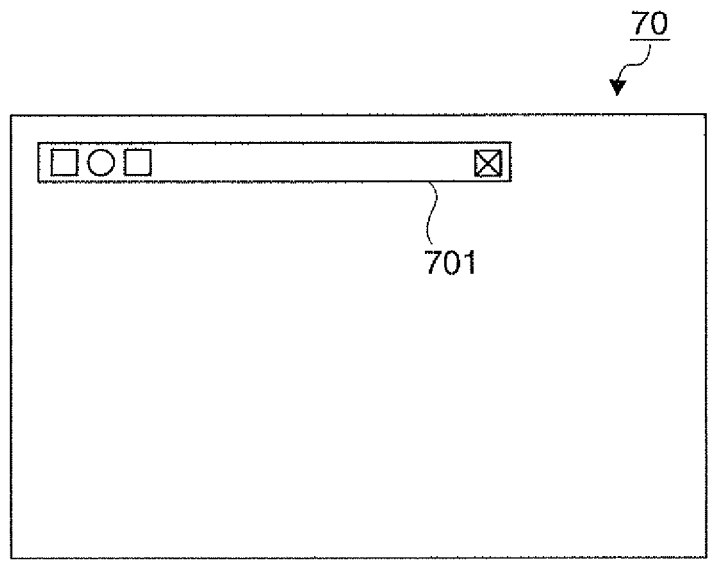
FIG. 8 shows an example of an electronic whiteboard application screen projected on a whiteboard.

When the projector 30 receives the image data of the electronic whiteboard application screen via the interface section 345 (step S19: Yes), the functional sections thereof perform processing on the image data, whereby the electronic whiteboard application screen is projected from the projection lens 313a of the projection system 313 (step S21). FIG. 8 is a schematic view of an electronic whiteboard application screen 70 projected on the whiteboard WB. In an upper-left part of the application screen 70, a tool bar 701 is formed.

Furthermore, the CPU of the PC 10 executes and starts the character recognition application stored in the hard disk drive (step S45). The guide size obtaining section 109 calculates the size of a character entry guide based on the number of pixels required for character recognition which is performed by the character recognizing section 105 and the size of 1 px, the size received from the projector 30 (step S47). For example, when the size of 1 px, the size obtained from the projector 30, is 0.75 mm/px and the number of pixels required for character recognition which is performed by the character recognizing section 105 is 50 px, the character entry guide size is 3.75 cm (=37.5 mm=0.75 mm/px×50 px). Incidentally, the number of pixels required for character recognition is a value which is previously set in the character recognition application and differs according to the type of the character recognition application installed in the PC 10.

In addition, the guide size obtaining section 109 obtains a designated size obtained by adding an adjustment value based on the projection distance D to the size of the character entry guide (step S49). For example, the adjustment value may be set in advance to have a proportional relation with the projection distance D. Suppose that the adjustment value when the projection distance D2 is 2.0 m is 0.5 cm. Then, the adjustment value when the projection distance D1 is 3.0 m can be set at 0.75 cm (=0.5×1.5) because 3.0 m/2.0 m=1.5.

Moreover, the adjustment value does not necessarily have the proportional relation with the projection distance D, and settings may be made such that the adjustment value is increased by a predetermined value every time the projection distance D is increased by 1 m. That is, if the adjustment value when the projection distance D2 is 2.0 m is 0.5 cm, the adjustment value when the projection distance D1 is 3.0 m is 1.0 cm (=0.5+0.5). The adjustment value when the projection distance D is 4.0 m can also set at 1.5 cm (=0.5+0.5+0.5), for example.

Next, the image processing section 107 generates the character entry guide of the designated size calculated by the guide size obtaining section 109 and transmits the character entry guide to the projector 30 (step S51).

Figure 9:
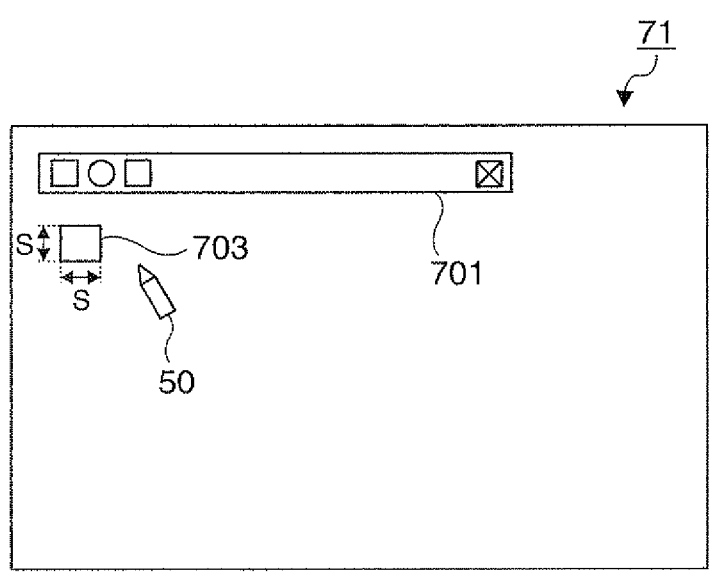
FIG. 9 shows an example of an image of an electronic whiteboard application screen with which a character entry guide is combined.

When the projector 30 receives an image of the character entry guide, the video/sound processing section 332 combines the character entry guide of the designated size with the electronic whiteboard application screen. Image data with which the character entry guide is combined is projected from the projection lens 313a of the projection system 313 (step S23). FIG. 9 shows a state in which an electronic whiteboard application screen 71 with which a character entry guide 703 is combined is projected on the whiteboard WB. The character entry guide 703 is formed under the tool bar 701 of the application screen 71.

The user A writes a character by hand with the pen device 50 by using the character entry guide 703 of the electronic whiteboard application screen projected on the whiteboard WB. Here, as shown in FIG. 9, in an upper-left part of the electronic whiteboard application screen, the character entry guide of a designated size S (for example, 4.5 cm (=3.75 cm (a character entry guide size when the projection distance D1 is 3.0 m)+0.75 cm (the adjustment value when the projection distance D1 is 3.0 m)) is displayed. The user A writes a character within the character entry guide by using the pen device 50.

The image-taking controlling section 352 takes an image of a movement of a tip of the pen device 50 with the camera 350 and transmits taken image data to the PC 10 via the interface section 345 (step S25).

When the PC 10 receives the taken image data via the interface section 101, the control section 102 converts the taken image data at the image-taking resolution of the camera 350 into coordinate data at a display resolution set in the PC 10. The image processing section 107 generates an image showing a handwritten character entry status based on the coordinate data at the display resolution, and transmits the image to the projector 30 (step S53). Moreover, the control section 102 obtains line data (display data) representing a trajectory of a pen nib from the taken image data taken at the image-taking resolution which is higher than the projection resolution in order to use the line data for character recognition processing, and stores the line data in the input data storing section 103 (step S55).

Figure 10:
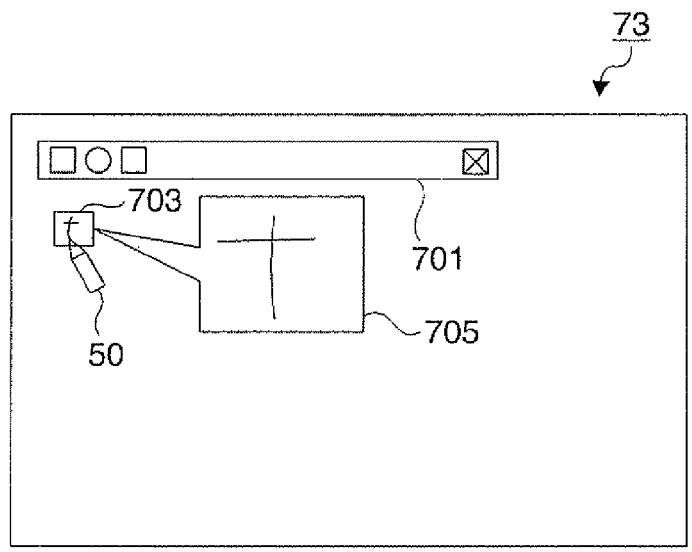
FIG. 10 shows an example of an image of an electronic whiteboard application screen with which an entry status is combined.

When the projector 30 receives the image showing the handwritten character entry status, the video/sound processing section 332 combines the handwritten character entry status with the electronic whiteboard application screen. Image data with which the entry status is combined is projected from the projection lens 313a of the projection system 313 (step S27). FIG. 10 is a schematic view of an electronic whiteboard application screen 73 projected on the whiteboard WB, the electronic whiteboard application screen 73 with which a handwritten character entry status 705 is combined. On the right side of the character entry guide 703 of the application screen 73, the entry status 705 is enlarged and projected.

In the PC 10, the character recognizing section 105 performs character recognition based on the line data stored in the input data storing section 103 and obtains font data corresponding to the handwritten character (step S57). Furthermore, the size of the handwritten character is calculated based on the line data, and a corresponding font size is determined. For example, when the size of the handwritten character is within a predetermined guide allowable range with respect to the designated size of the character entry guide obtained in step S49, the size can be determined as a standard font size of the character recognition application; when the size of the handwritten character is not within the guide allowable range, the size can be determined as a size other than the standard font size.

The size of the handwritten character can be obtained by multiplying the size (mm/px) of 1 px, the size calculated in step S17, by an entered character size (px). The entered character size is the maximum number of pixels occupied by a handwritten character in a vertical direction or a lateral direction, the pixels of the pixels forming the character entry guide. Descriptions will be given by taking up the character entry guide shown in FIG. 11 as an example. The number of pixels occupied by a handwritten character "あ" in the character entry guide in the vertical direction is 8 px, and the number of pixels occupied by the handwritten character in the lateral direction is 7 px. Therefore, the entered character size detected at the image-taking resolution is 8 px, which is the number of pixels in the vertical direction.

Moreover, the guide allowable range is a value which is previously set in the character recognition application. For example, if the guide allowable range is set at ±30%, when the designated size of the character entry guide is 3.0 cm, the guide allowable range is 2.1 cm or more but 3.9 cm or less. Therefore, if the size of the handwritten character is 2.1 cm or more but 3.9 cm or less, the character is recognized as having the standard font size; if the size of the handwritten character is less than 2.1 cm, the character is recognized as having a font size smaller than the standard font size; if the size of the handwritten character is more than 3.9 cm, the character is recognized as having a font size greater than the standard font size. That is, even if the characters written by the user by hand vary in size, the characters are recognized as having the same font size if the variations are within the predetermined guide allowable range.

This allows the user A to perform handwritten input operation continuously without being concerned about variations in character size when the user A writes characters by hand. Moreover, since a default is set at the standard font size and character recognition can be performed by automatically changing the font size based on whether or not the size is within the guide allowable range, the user A can continuously perform handwritten input operation without specifying the font size. For example, even when the user A writes a lowercase character by hand after writing an uppercase character by hand or writes the uppercase character by hand after writing the lowercase character by hand, the user A does not have to change the font size, and, since character recognition is performed based on the automatically changed font size, it is possible to provide the character entry guide with a high degree of ease of use.

Incidentally, in this embodiment, the method has been described in which the characters are expressed by dividing them in three categories: "large", "medium", and "small" based on whether or not the font size is within the guide allowable range, more than the guide allowable range, or less than the guide allowable range. However, settings can also be made by dividing the size into more categories.

Figure 11:
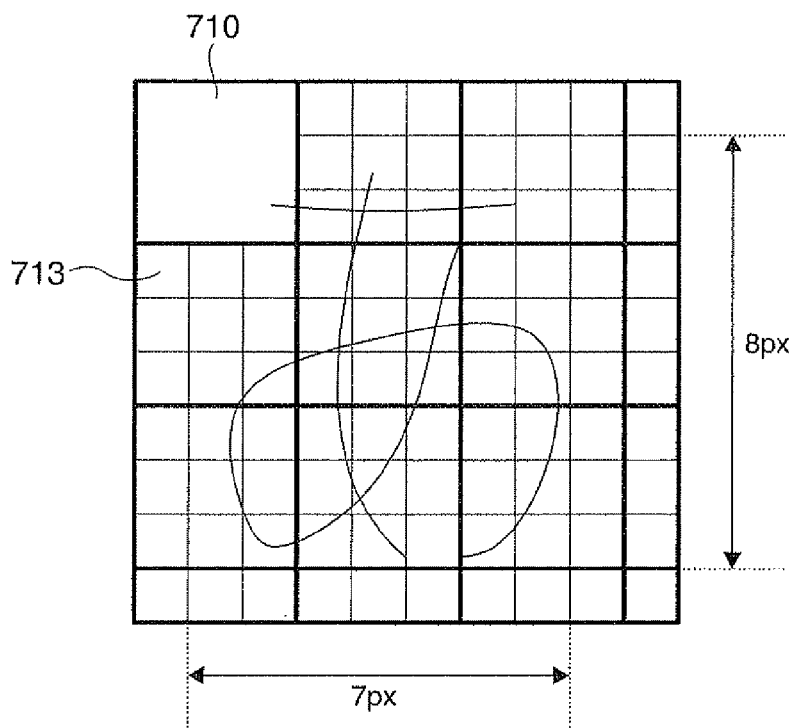
FIG. 11 is a schematic view for explaining a method for obtaining an input size of a handwritten character.

Incidentally, in FIG. 11, one pixel 710 at the projection resolution and one pixel 713 at the image-taking resolution are shown for comparison. The one pixel 710 at the projection resolution is larger than the one pixel 713 at the image-taking resolution. That is, in this embodiment, an image of the character written by hand in the character entry guide is taken by the camera 350 with a higher (finer) resolution than the projection resolution of the projector 30. Since character recognition is performed based on the high-resolution taken image data, the character written on the whiteboard WB by hand can be smaller than that of the existing example. This makes it possible to make effective use of the whiteboard WB.

The image processing section 107 transmits text data of the character obtained by character recognition, the text data with the font size determined by the method described above, to the projector 30 (step S59).

Figure 12:
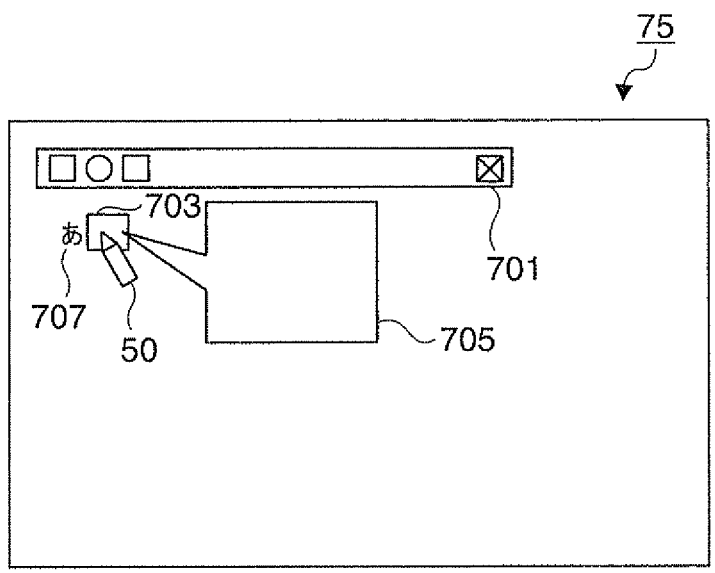
FIG. 12 shows an example of an image of an electronic whiteboard application screen with which a character obtained by character recognition is combined.

When the projector 30 receives the text data obtained by character recognition, the video/sound processing section 332 combines a text character obtained by character recognition with the electronic whiteboard application screen. Image data with which the text character obtained by character recognition is combined is projected from the projection lens 313a of the projection system 313 (step S29). FIG. 12 is a schematic view of an electronic whiteboard application screen 75 projected on the whiteboard WB, the electronic whiteboard application screen 75 with which a character 707 "あ" obtained by character recognition is combined. The character entry guide 703 and the entry status 705 are displayed after being moved to their respective positions in which the next handwritten input is performed.

According to the embodiment described above, character recognition is performed on the handwritten input trajectory of the tip of the pen device 50 based on the line data detected at a higher (finer) detection resolution than the projection resolution. That is, unlike the existing example in which the detection resolution is converted into the display resolution of a computer main body, character recognition is performed by using the detection resolution as it is. As a result, even if a small character is written, a character is prevented from becoming illegible, and character recognition can be performed normally. Moreover, since the character entry guide 703 is projected as a character entry guide including the number of pixels required for character recognition, the user A can recognize a size necessary for character recognition. This makes it possible to display the easy-to-use character entry guide 703 for the user A situated in a position near the whiteboard WB.

Moreover, according to the embodiment described above, the entry status is combined with the image. As a result, even if the user writes a small character by hand, the user can easily grasp the status of the handwritten character and write the character easily.

Furthermore, according to the embodiment described above, by holding the line data, it is possible to perform character recognition collectively on all the trajectories written in the character entry guide 703.

In addition, according to the embodiment described above, since the size of the character entry guide 703 is obtained based on the projection distance D and the number of pixels required for character recognition, it is possible to provide the character entry guide of an appropriate size even if the projection distance D is changed.

Moreover, according to the embodiment described above, since the projection distance D can be detected according to the projection width W obtained when the camera 350 takes an image of the whiteboard WB, there is no need to provide an extra unit for detecting the projection distance in addition to the camera 350.

Furthermore, according to the embodiment described above, the size of the character entry guide 703 is a designated size obtained by the addition of an adjustment value. This makes it possible for the user A to perform handwritten input in a size in which the user can write a character more easily.

In addition, in the embodiment described above, the information recognition system according to the invention is formed of the projector 30 and the PC 10; however, the information recognition system can also be realized by other structures. For example, a liquid crystal display or a plasma display which is provided with a touch panel as an information detecting section can be adopted as a display surface.

Moreover, the functional sections provided in the PC 10 in the embodiment described above may be provided in the projector 30. That is, the projector 30 alone can form the information recognition system. Furthermore, as mentioned above, the functional sections of the PC 10 may be formed in the liquid crystal display or the plasma display, and the liquid crystal display or the plasma display alone may form the information recognition system.

Incidentally, in the embodiment described above, as the information detecting section which performs detection at a higher (finer) detection resolution than the display resolution, the camera 350 built into the projector 30 is used; however, other structures may be adopted. Some examples are as follows.

(Digital pressure-sensitive type) Two electricity-conducting sheets are separated by a fine gap. A touch on the surface of one of the sheets come into contact with another sheet, and an electric current passes through a part in which the sheets make contact with each other. Coordinates at which the sheets make contact with each other are obtained based on an electrical resistance value of the sheet.

(Electromagnetic type) Wires running in an X-axis direction and a Y-axis direction are embedded immediately below a board surface, and a contact position is obtained by electromagnetic conduction between the wires and a pen device in which a coil is embedded.

(Laser type) Infrared lasers are placed at both ends of an upper side of a board, a surface of the whiteboard is monitored by a laser beam, and a reflector provided in a pen device reflects the laser beam, whereby a position of the pen device is detected.

(Infrared radiation, ultrasonic type) Infrared emitting elements are placed on the left, right, top, and bottom, infrared radiation is emitted in every direction, and a position at which the infrared radiation is blocked is detected, whereby coordinates are obtained.

(Optical, infrared radiation type) When the surface of the whiteboard is pressed with a finger or a marker, a position of a pressed point is obtained by trigonometry by an infrared emitting device and a light receiving device which monitor the surface of the board.

Incidentally, when a structure other than the camera 350 built into the projector 30 is adopted as the information detecting section, it is possible to adopt other structures which detect the projection distance based on the amount of reflected light or the angle of reflection as the distance detecting section. Moreover, in this case, there is no need to provide the projection distance determining table 354 shown in FIG. 4, and, instead, it is necessary simply to provide a table defining a correspondence relationship between the projection distance and the size of 1 px.

Moreover, in the embodiment described above, the camera 350 is built into the projector 30; however, the camera 350 may be provided externally. Furthermore, the camera 350 does not necessarily have to be connected to the projector 30 and may be connected to the PC 10.

In addition, in the embodiment described above, only one character entry guide 703 is displayed in the electronic whiteboard application screen; however, a plurality of the character entry guides can also be displayed therein. In this case, after a handwritten character is written in each character entry guide, character recognition can be collectively performed on the handwritten characters.

Moreover, in the embodiment described above, a projector using a liquid crystal light valve, the projector which performs projection by modulating the light from the light source by using the liquid crystal light valves 312R, G, and B which are a light modulating section, has been described as an example. However, the invention can also be applied to a projector adopting other methods. Specifically, the invention can also be applied to a projector adopting a projection method using a DMD (digital micro mirror device), which is a so-called DLP (digital light processing)® method. That is, the DLP method is a method by which the light of a lamp producing a white light is condensed by a lens and is shone onto the DMD, and the light obtained when each mirror of the DMD is close to an ON state is enlarged by the other lens and is projected on a screen. The invention can also be applied to a projector adopting such a method.

Furthermore, in this embodiment, the information recognition system 1 including the projector 30 performing projection by using a discharge lamp as a light source has been described as an example. However, a projector which performs projection by using an LED light source or a laser light source as the light source may be used. Moreover, in place of the system formed of the PC 10 and the projector 30, the projector 30 may be provided with the functions of the PC 10.

What is claimed is:

1. An information recognition system, comprising:
    a display section displaying an image on a display surface at a predetermined display resolution;
    an image combining section combining a character entry guide with the image, the character entry guide assisting handwritten input to the display surface;
    an information detecting section detecting handwritten input information at a detection resolution which is higher than the display resolution, the handwritten input information input to the display surface according to the character entry guide; and
    a character recognizing section performing character recognition based on the information detected at the detection resolution, wherein
    the display surface is a projection surface on which the image is projected by a projector provided with at least the display section, and
    the information recognition system further comprises:
    a distance detecting section detecting a projection distance to the projection surface; and
    a size obtaining section obtaining the size of the character entry guide based on the projection distance and a predetermined number of pixels required for character recognition.

2. The information recognition system according to claim 1, wherein
    the image combining section combines the information detected by the information detecting section with the image as a handwritten entry status adjusted to the display resolution.

3. The information recognition system according to claim 1, further comprising:
    a storing section storing the information detected at the detection resolution as display data,
    wherein
    the character recognizing section performs character recognition based on the display data stored in the storing section.

4. The information recognition system according to claim 1, wherein
    the information detecting section is an image taking section taking an image of the projection surface, and
    the distance detecting section detects the projection distance to the projection surface according to a projection width of the projection surface whose image is taken by the image taking section.

5. The information recognition system according to claim 4, wherein
    the size obtaining section obtains a designated size obtained by adding an adjustment value according to the projection distance to the size of the character entry guide, and
    the image combining section combines the character entry guide of the designated size with the image.

6. The information recognition system according to claim 1, wherein
    the character recognizing section performs character recognition without changing the size of character when variations in size of the handwritten input information is within a predetermined allowable range.

7. A method for controlling an information recognition system provided with an information detecting device and an image supplying device, comprising:
    (a) displaying an image on a display surface at a predetermined display resolution, the display surface being a projection surface on which the image is projected by a projector;
    (b) combining a character entry guide assisting handwritten input to the display surface with the image;
    (c) detecting handwritten input information input to the display surface according to the character entry guide at a detection resolution which is higher than the display resolution;
    (d) performing character recognition based on the information detected at the detection resolution;
    (f) detecting a projection distance to the projection surface; and
    (g) obtaining the size of the character entry guide based on the projection distance and a predetermined number of pixels required for character recognition.

8. The control method according to claim 7, wherein
    in the step (b), the information detected by the information detecting device is combined with the image as a handwritten entry status adjusted to the display resolution.

9. The control method according to claim 7, further comprising:
    (e) storing the information detected at the detection resolution in the step (c) as display data,
    wherein
    in the step (d), character recognition is performed based on the display data stored in the step (e).

10. The control method according to claim 7, wherein
    the step (c) includes taking an image of the projection surface, and
    in the step (f), the projection distance to the projection surface is detected according to a projection width of the projection surface whose image is taken.

11. The control method according to claim 10, wherein
    in the step (g), a designated size obtained by adding an adjustment value according to the projection distance to the size of the character entry guide is obtained, and
    in the step (b), the character entry guide of the designated size is combined with the image.

12. The control method according to claim 7, wherein
    in the step (d), character recognition is performed without changing the size of character when variations in size of the handwritten input information is within a predetermined allowable range.

* * * * *